(12) United States Patent
Reed

(10) Patent No.: US 7,433,654 B2
(45) Date of Patent: Oct. 7, 2008

(54) ROTATABLE FUNCTION SELECTORS IN COMMUNICATION HANDSETS AND METHODS THEREFOR

(75) Inventor: Robert R. Reed, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 1336 days.

(21) Appl. No.: 10/036,839

(22) Filed: Dec. 21, 2001

(65) Prior Publication Data

US 2003/0119569 A1 Jun. 26, 2003

(51) Int. Cl.
*H04B 1/38* (2006.01)

(52) U.S. Cl. .................. 455/90.1; 455/575.1; 455/550.1

(58) Field of Classification Search ............ 455/90, 455/575, 550, 569, 66, 74; 379/102.06, 355.01
See application file for complete search history.

(56) References Cited

U.S. PATENT DOCUMENTS

| 4,484,029 | A | 11/1984 | Kenney |
| 5,163,089 | A | 11/1992 | Kotani et al. |
| 5,504,812 | A | 4/1996 | Vangarde |
| 5,504,813 | A | 4/1996 | Takasaki |
| 6,016,347 | A | 1/2000 | Magnasco et al. |
| 6,097,964 | A * | 8/2000 | Nuovo et al. ............... 455/550 |
| 6,115,620 | A * | 9/2000 | Colonna et al. ............ 455/575 |
| 6,317,489 | B1 * | 11/2001 | Parsadayan ........... 379/102.06 |
| 6,434,371 | B1 | 8/2002 | Claxton |
| 2003/0076303 | A1 | 4/2003 | Huppi |

FOREIGN PATENT DOCUMENTS

FR 2679086 A1 * 1/1993

OTHER PUBLICATIONS

Fujitsu Fan Dancing in 3G Prototype, one page.

* cited by examiner

*Primary Examiner*—Lana N Le
(74) *Attorney, Agent, or Firm*—Roland K. Bowler, II

(57) ABSTRACT

A wireless communication handset (10) having first and second movable coupled housing portions (20, 30) that rotate in corresponding first and second substantially parallel planes. The wireless communication handset is in a first operating mode when the first and second housing portions are rotated to a first angular configuration, the wireless communication handset in a second operating mode when the first and second housing portions are rotated to a second angular configuration, and the wireless communication handset in a third operating mode when the first and second housing portions are rotated to a third angular configuration.

16 Claims, 5 Drawing Sheets

US 7,433,654 B2

ROTATABLE FUNCTION SELECTORS IN COMMUNICATION HANDSETS AND METHODS THEREFOR

FIELD OF THE INVENTIONS

The present inventions relate generally to communication devices, and more particularly to mobile communication devices having configurable housings for controlling various handset functions and methods therefor.

BACKGROUND OF THE INVENTIONS

Clamshell style cellular communications handsets that operate the hook switch when a hinged portion of the housing is opened and closed are known generally. The V.70/V.71 cellular telephones by Motorola, Inc., for example, includes a rotatable blade used as a hook switch detector that transitions the phone between stand-by and active modes depending on the position of the blade.

U.S. Pat. No. 5,504,813 entitled "Potable Telephone" discloses a cellular telephone handset housing having a microphone boom pivotally coupled to a side portion thereof. In U.S. Pat. No. 5,504,813, pivoting the microphone boom between stowed and extended positions actuates a Hall effect hook switch or an optical hook switch disposed alongside the housing.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

According to the invention, generally, a communication device is operated in different modes, for example standby and active modes, by rotating first and second housing portions in corresponding standby and active mode configurations. Other stand-by and active mode functions of the device are invoked by re-configuring the relative positions of the housing portions.

Figure 1:
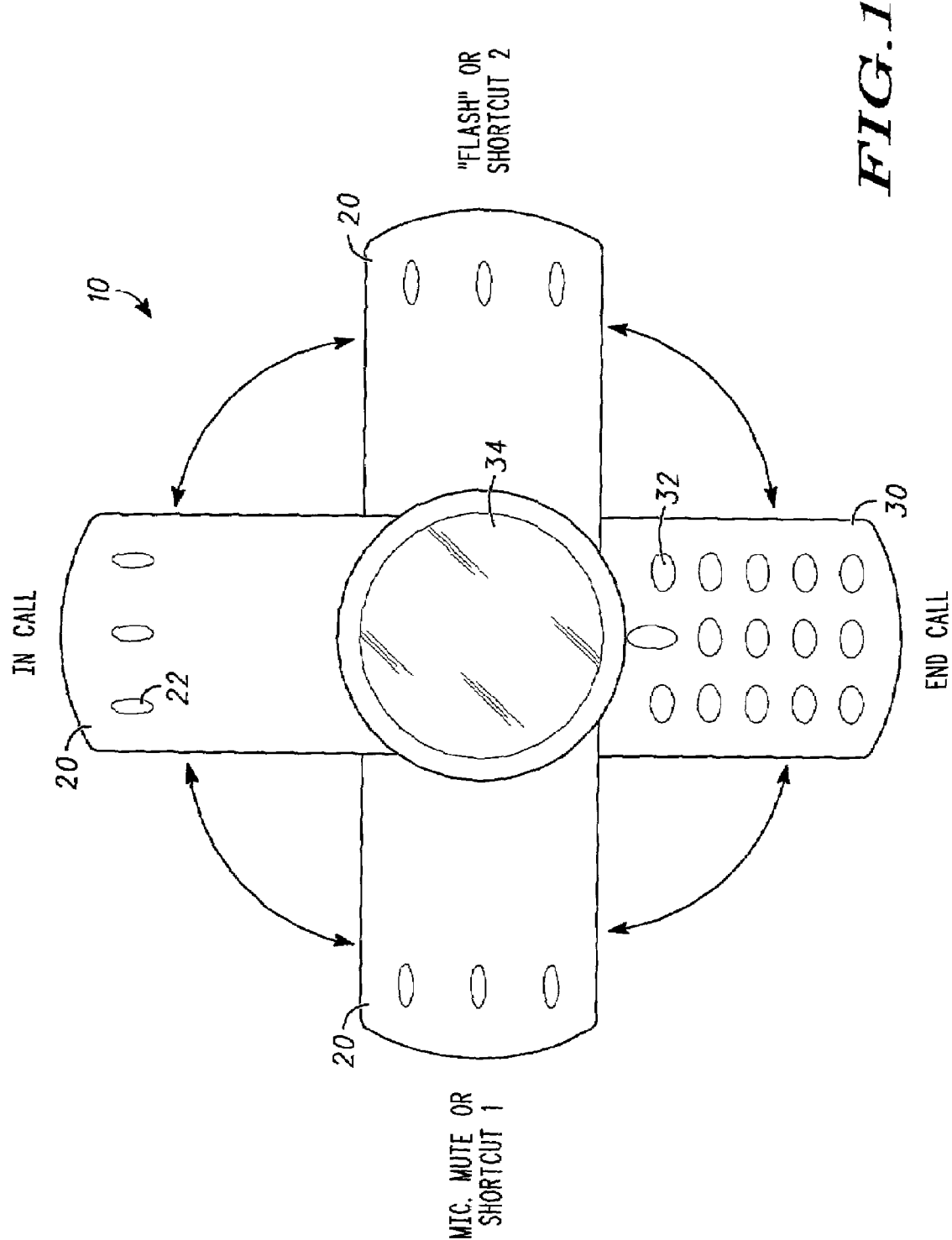
FIG. 1 is an exemplary mobile wireless communication handset having a configurable housing that controls handset functions.

In FIG. 1, the communication device is a wireless communication handset 10 comprising first and second rotatably coupled housing portions 20 and 30. The first and second housing portions are rotatable in corresponding first and second substantially parallel planes. In FIG. 1, the first housing portion 20 is shown in three different positions, namely at the 9:00, 12:00 and 3:00 o'clock positions, relative to the second housing portion 30.

In the exemplary handset, the first housing portion 20 is a rotatable blade housing a speaker below sound ports 22, and the second housing portion 30 includes a keypad with keys 32 (only some of which are identified), a display 34 and internally housed communications circuitry. In other embodiments, the first housing portion may be some other rotatable housing portion or rotatable member, for example a dial disposed on or partially within the communication device.

In FIG. 1, the wireless communication handset is in the standby mode of operation when the blade 20 overlaps the second housing portion 30, thus covering the keypad. This configuration is not illustrated, but corresponds to the blade 20 being positioned at the 6:00 o'clock position. The handset 10 in FIG. 1 is in the active mode of operation when the first and second housing portions are rotated from the standby configuration to an active configuration. The blade 20 in FIG. 1 is cable of rotation 360 degrees relative to the second housing portion 30. The active configuration may include a range of active mode angular separation between the first and second housing portions, which is defined by software. In other embodiments, the active and standby modes may be invoked by other configurations of the housing portions.

Various functions of the communication device, for example, flash, mute, software shortcuts, etc. are invoked by configuring the first and second housing portions in corresponding configurations. Generally, the wireless communication device performs a first active mode function when the first and second housing portions are separated by a first angle, and the wireless communication handset performs a second active mode function when the first and second housing portions are separated by a second angle. The functions assigned to the various configurations of the handset are software programmable.

In one embodiment, the various functions performed by the device are active mode functions, and thus the corresponding angles are within the range of active mode angular separation. In other embodiments, the functions performed are standby-mode functions, or combinations of both active and standby mode functions.

In FIG. 1, for example, the blade 20 in FIG. 1 is rotated 180 degrees from an "End Call" position, where the device is in standby mode, to an active mode "In Call" position to answer a call. The blade 20 may also be rotated back to the "End Call" position to terminate the call and re-enter the standby mode. The blade 20 in FIG. 1 may also be rotated clockwise 90 degrees from the "In Call" position to the "Flash" position thus invoking the flash function, for example to answer a call waiting or to implement a three-way call. The blade may also be rotated counter-clockwise 90 degrees from the "In Call" position to invoke a "Mute" function. In one embodiment, rotating the blade from any active mode position deactivates the function associated with a particular position. The "Mute" function is deactivated, for example, by rotating the blade from the "Mute" position to the "In Call" position or to some other position.

Additional functions may be invoked by rotation of the blade or more generally by rotating the rotatable housing portion. In FIG. 1, for example, functions may be assigned to corresponding 45 degree rotation increments of the blade 20. Other functions that may be invoked by rotation of the blade include, for example, launching software, e.g. a WAP browser, retrieve voice mail, switch NAMS, etc. The functions assigned to the positions of the blade are preferably assignable by the user, for example by entering a set-up mode of the device. The function associated with each blade position is a function generally of encoder design, example of which are discussed below, and the memory limit of the user.

The relative positions of the housing portions is detected by a rotary encoder having a first encoder portion coupled to one of the housing portions and a relatively fixed encoder portion coupled to the other housing portion. In the exemplary wireless communication handset application, the rotary encoder has a standby mode electrical output when the housing portions are in the standby configuration, an active mode electrical output when the housing portions are in the active mode configuration, and corresponding functional electrical outputs when the housing portions are configured for the corresponding functions. The functions may be active mode or standby mode functions.

Figure 2:
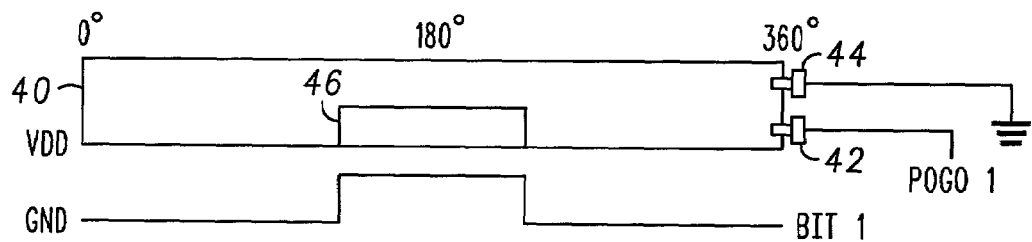
FIG. 2 is an exemplary one-bit rotary encoder and corresponding digital encoder output diagram.

FIG. 2 illustrates a first exemplary rotary encoder embodiment comprising a partially conductive strip 40 with bit patterns formed thereon. The strip 40 is formed into a ring and fastened to one housing portion. At least two conductors, for example, pogo pins 42 and 44, are coupled to the other housing portion so that the pins are in contact with the conductive strip.

Figure 3:
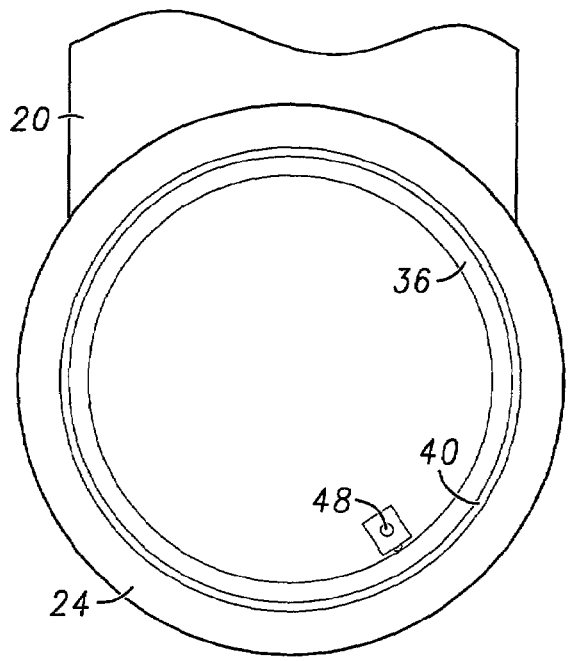
FIG. 3 is sectional view of an exemplary rotatable housing portion having a first exemplary rotary encoder.
Figure 4:
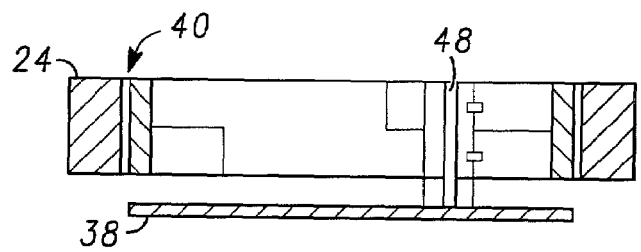
FIG. 4 is a section view of a portion of a rotatable housing.

In FIGS. 3 and 4, the conductive strip 40 is disposed on an inner surface of a housing ring 24, which is part of the rotatable blade 20 in the exemplary embodiment. Alternatively, the bit pattern may be formed directly on the surface of the ring, for example by depositing conductive and non-conductive materials thereon. FIG. 3 illustrates a pogo pin mounting assembly 48 mounted on an inner ring 36 of the main housing portion, and FIG. 4 illustrates the pogo pin mounting assembly 48 disposed on a circuit board 38.

Figure 5:
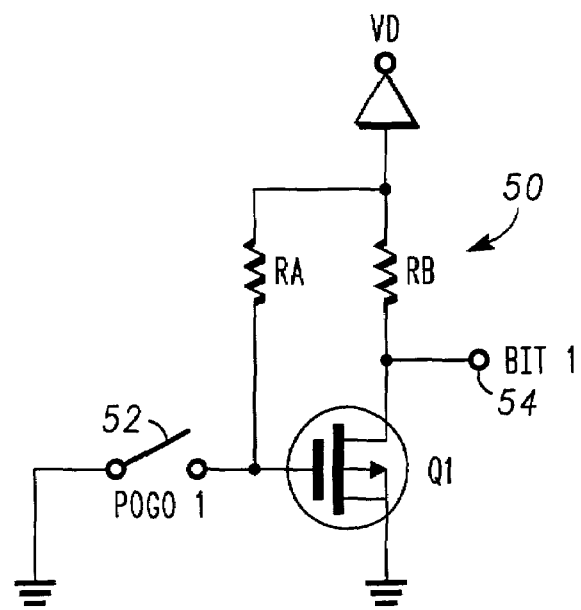
FIG. 5 is a first exemplary pull-down circuit.
Figure 6:
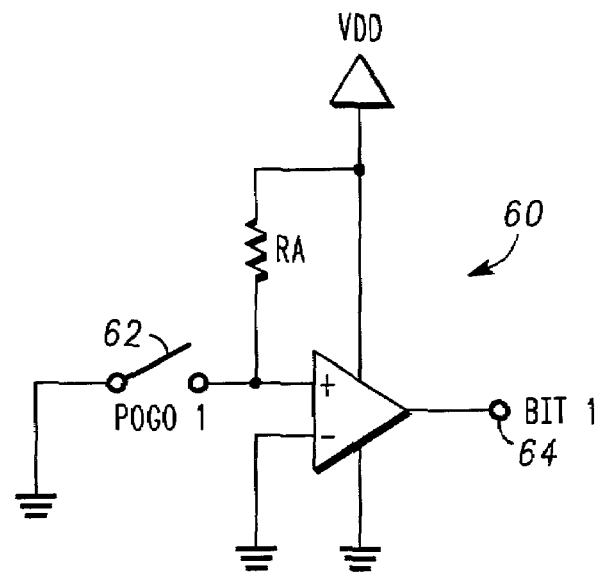
FIG. 6 is a second exemplary pull-down circuit.

The conductors of the rotary encoder are coupled to an electrical circuit that detects when an electrical connection between the conductors is made and broken by conductive and non-conductive portions of the strip. FIGS. 5 and 6 illustrate exemplary voltage pull-down circuits 50 and 60, respectively, with corresponding switches 52 and 62 representative of the contact made between the conductors of the rotary encoder. FIG. 2 also illustrates a binary signal output produced by a voltage pull-down circuit as the conductive strip rotates past the pogo pins. More particularly, in the circuits of FIGS. 5 and 6, the signal output at 54 and 64, respectively, will be high when, in FIG. 2, the electrical connection between pins 42 and 44 is broken by non-conductive portion 46 of the strip 40.

The rotary encoder scheme may be modified to encode additional rotatable housing positions by adding pogo pins, corresponding bit patterns on the conductive strip, and corresponding electrical circuits. A two-bit encoder, which includes a ground pin and two bit-pins encodes four different blade positions, while three bit-pins encode eight different blade positions. The location of the bit patterns on the housing ring will determine the positions of the rotatable blade at which changes in the encoder output may be used to control functions of the handset.

Figure 7:
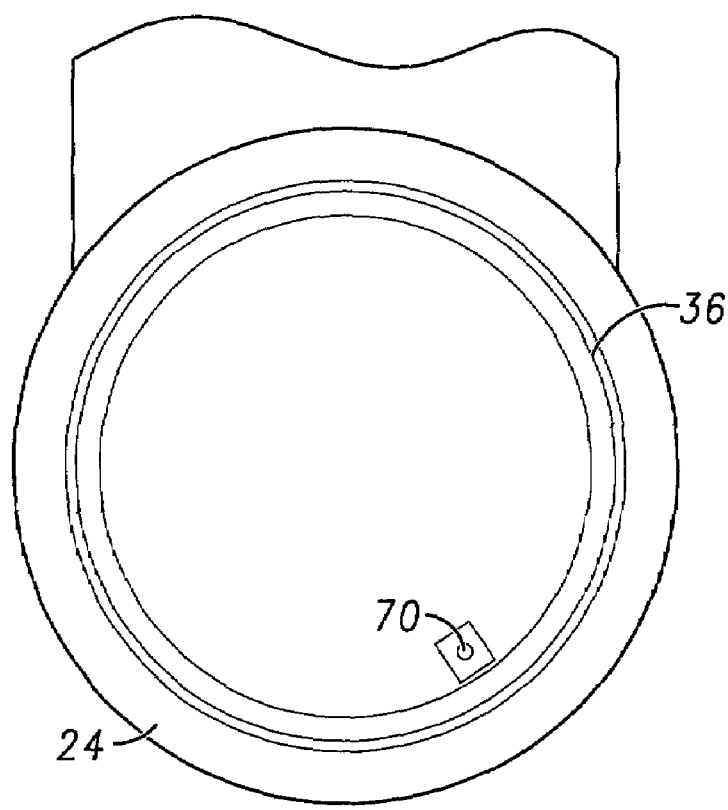
FIG. 7 is sectional view of an exemplary rotatable housing portion having a second exemplary rotary encoder.
Figure 8:
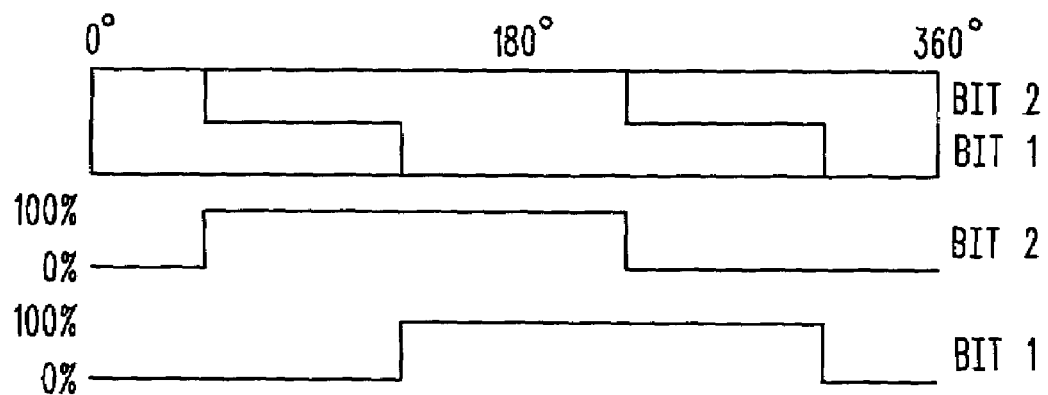
FIG. 8 is an exemplary two-bit rotary encoder and corresponding digital encoder output diagram.

FIG. 7 is an alternative optical rotary encoder comprising an optical detector device 70 mounted on an inner ring 36 of the main housing portion. FIG. 8 illustrates a 2-bit Gray code optical pattern 41 that is disposed on the outer housing ring 24 in FIG. 7. FIG. 8 also illustrates the corresponding optical detector device outputs, which correspond to energy reflected by the bit pattern and detected by the detector. The 2-bit Gray code optical pattern of FIG. 8 can encode four distinct blade positions. Other encoder schemes may be used alternatively.

Figure 9:
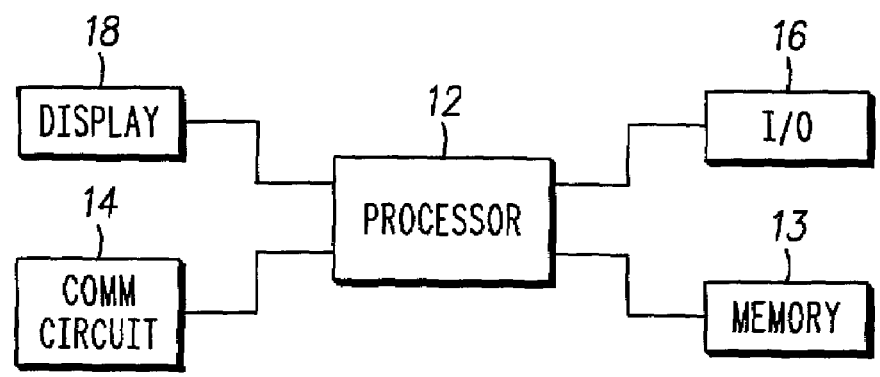
FIG. 9 is an exemplary communication device schematic block diagram.

In FIG. 9, an exemplary wireless communication device comprises a processor 12 coupled to memory 13, a communication circuit 14, input/output circuits 16, and a display 18. Other communication devices may be configured differently.

The rotary encoder is one of the input circuits. In the standby configuration, the standby mode electrical output of the rotary encoder is coupled to the processor, and in the active configuration, the active mode electrical output of the rotary encoder is coupled to the processor. Similarly, when the device housing portions are configured for a particular function, a corresponding function electrical output of the rotary encoder is coupled to the processor. The processor thus controls the mode and function of the device in response to the encoder outputs.

In some embodiments, indexing members, for example detents, are disposed on the housing portions in alignment with blade positions at which different functions are invoked to provide accurate rotational positioning of the blade and to maintain the blade in its selected position until moved.

Figure 10:
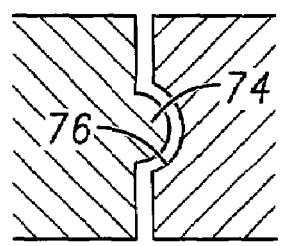
FIG. 10 is a section view of a portion of a rotatable housing.

FIG. 10 illustrates an exemplary protruding member 74 on one housing portion that seats in a complementary recess 76 disposed in the other housing portion to fix the relative positions of the housing portions in a particular configuration at which a desired handset function is performed. Generally multiple recesses may be disposed about the housing ring portion to accommodate the protrusion as the housing portions are rotated. Other indexing schemes may be used alternatively.

In some embodiments, the indexing members provide tactile and/or audible cues coincident with the configurations of the handset at which different function are performed. The handset may also include visual markers disposed on the housing to visually identify the various configurations of the housing portions. In some embodiments, for example, a passive tactile and/or snapping audio sensation is provided when the protruding member 74 seats in the recesses. In other embodiments, the sensation is active, for example, the physical sensation is produced by a processor-controlled audio and/or tactile output device, for example an audio output signal of the processor is coupled to the audio output device when the blade or other rotatable member is positioned relative to the other housing portion, thus indicating that the blade is positioned for a particular function.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A wireless communication handset, comprising:
   a housing;
   a blade rotatably coupled to the housing, the blade rotatable in a plane;
   a rotary encoder having a first encoder portion coupled to the blade and a stationary encoder portion,
   the rotary encoder having a first active mode function output when the blade is in a first position,
   the rotary encoder having a second active mode function output when the blade is in a second position.

2. The wireless communication handset of claim 1, the wireless communication handset performing a first active mode function in response to the first handset active mode function output of the rotary encoder, the wireless communication handset performing a second active mode function in response to the second active mode function output of the rotary encoder.

3. The wireless communication handset of claim 2, the first active mode function of the wireless communication handset is a flash function, the second active mode function of the wireless communication handset is a mute function.

4. The wireless communication handset of claim 1, a processor coupled to the rotary encoder, an audio output device coupled to the processor, a first audio output signal of the processor coupled to the audio output device when the blade is in the first position, a second audio output signal of the processor coupled to the audio output device when the blade is in the second position.

5. The wireless communication handset of claim 1, a processor coupled to the rotary encoder, a tactile output device coupled to the processor, a first tactile output signal of the processor coupled to the tactile output device when the blade is in the first position, a second tactile output signal of the processor coupled to the tactile output device when the blade is in the second position.

6. The wireless communication handset of claim 1, first and second blade position indexing members disposed on the housing in alignment with the first and second positions of the blade.

7. The wireless communication handset of claim 1, the blade rotatable through an angular range, the first and second blade positions separated by an angle within the angular range.

8. The wireless communication handset of claim 1, the rotary encoder having a third active mode function output when the blade is in a third position, the rotary encoder having a standby function output when the blade is in a fourth position, the wireless communication handset performing a third active mode function in response to the third handset function output of the rotary encoder, the wireless communication handset operating in stand-by made in response to the standby function output of the rotary encoder.

9. The wireless communication handset of claim 8, the blade substantially overlapping the housing in the fourth position, the blade rotated approximately 180 degrees between the fourth and first positions, the third position of the blade between the first and fourth positions, the second position of the blade between the fourth and first positions substantially opposite the third position.

10. A wireless communication handset, comprising:
first and second rotatably coupled housing portions,
the first and second housing portions rotatable in corresponding first and second substantially parallel planes;
the wireless communication handset in a standby mode when the first and second housing portions are rotated to a standby angular configuration,
the wireless communication handset in a call mode when the first and second housing portions are rotated from the standby angular configuration to a call angular configuration,
the wireless communication handset performing a first function when the first and second housing portions are rotated to a first function angular configuration between the standby and call angular configurations;
a rotary encoder having a first encoder portion coupled to the first housing portion and a second encoder portion coupled to the second housing portion, the rotary encoder having a standby mode electrical output when the first and second housing portions are in the standby angular configuration, the rotary encoder having a call mode electrical output when the first and second housing portions are in the call angular configuration, the rotary encoder having a first function electrical output when the first and second housing portions are in the first function angular configuration.

11. The wireless communication handset of claim 10, the wireless communication handset performing a second active mode function when the first and second housing portions are rotated to a second angular configuration between the standby and call angular configurations.

12. The wireless communication handset of claim 10, the first and second housing portions are at least partially overlapping in the standby angular configuration, the first and second housing portions are separated by approximately 180 degrees when the first and second housing portions are in the call angular configuration.

13. The wireless communication handset of claim 10,
a processor,
the standby mode electrical output of the rotary encoder coupled to the processor when the first and second housing portions are in the standby angular configuration,
the call mode electrical output of the rotary encoder coupled to the processor when the first and second housing portions are in the call angular configuration,
the first function electrical output of the rotary encoder coupled to the processor when the first and second housing portions are in the first function angular configuration.

14. A wireless communication device operable in active and standby modes, comprising:
a housing;
a rotatable member rotatably coupled to the housing,
a rotary encoder having a first encoder portion coupled to the rotatable member and a stationary encoder portion;
the rotary encoder encoding a first active mode function output when the rotatable member is positioned in a first position relative to the housing and the wireless communication device is not in the standby mode,
the rotary encoder encoding a second active mode function output when the rotatable member is positioned in a second position relative to the housing and the wireless communication device is not in the standby mode.

15. The device of claim 14, a processor, the first active mode function output of the rotary encoder coupled to the processor when the rotatable member is in the first position, the second active mode function output of the rotary encoder coupled to the processor when the rotatable member is in the second position.

16. The device of claim 14, rotatable member position alignment members disposed on the rotatable member and the housing portion.

* * * * *